United States Patent [19]

Schmadel, Jr. et al.

[11] Patent Number: 4,697,888

[45] Date of Patent: * Oct. 6, 1987

[54] FREQUENCY SHIFTED CAVITY FOR ELECTROMAGNETIC RADIATION

[75] Inventors: Donald C. Schmadel, Jr., Kensington, Md.; William H. Culver, Washington, D.C.

[73] Assignee: Chevron Research Company, San Francisco, Calif.

[*] Notice: The portion of the term of this patent subsequent to Apr. 29, 2003 has been disclaimed.

[21] Appl. No.: 370,434

[22] Filed: Apr. 21, 1982

[51] Int. Cl.⁴ .............................. G02F 1/11; G02F 1/33
[52] U.S. Cl. ...................................................... 350/358
[58] Field of Search ............................ 372/94; 350/358

[56] References Cited

U.S. PATENT DOCUMENTS

| 3,422,370 | 7/1964  | Collins, Jr. ........................ 331/94.5 |
| 3,551,690 | 12/1970 | Korpel ............................ 350/358 X |
| 3,834,790 | 9/1974  | Macken ............................ 350/157 |
| 4,013,365 | 3/1977  | Vali et al. ....................... 372/94 X |
| 4,083,018 | 4/1978  | Yang et al. ...................... 331/94.5 |
| 4,131,792 | 12/1978 | Schlossberg ..................... 250/199 |
| 4,250,474 | 2/1981  | Joseph ............................ 350/358 |
| 4,265,517 | 5/1981  | Blair et al. ..................... 350/358 |
| 4,272,158 | 6/1981  | Johnston, Jr. et al. ........... 372/94 X |
| 4,429,393 | 1/1984  | Giuliano .......................... 372/94 X |
| 4,473,275 | 9/1984  | David, Jr. et al. ............... 350/358 |
| 4,586,184 | 4/1986  | Hess .............................. 350/358 |

FOREIGN PATENT DOCUMENTS

| 1356035 | 8/1971 | United Kingdom . |
| 1587992 | 5/1978 | United Kingdom . |
| 2012472 | 1/1979 | United Kingdom . |
| 2017392 | 3/1979 | United Kingdom . |
| 2089105 | 8/1981 | United Kingdom . |

OTHER PUBLICATIONS

"Interaction Between Light and Sound" by Robert Adler—IEEE Spectrum (May 1967).

Primary Examiner—John K. Corbin
Assistant Examiner—Vincent J. Lemmo
Attorney, Agent, or Firm—E. J. Keeling; A. S. Zavell; V. A. Norviel

[57] ABSTRACT

A frequency shifted cavity apparatus for electromagnetic radiation.

34 Claims, 13 Drawing Figures

U.S. Patent  Oct. 6, 1987  Sheet 1 of 6  4,697,888
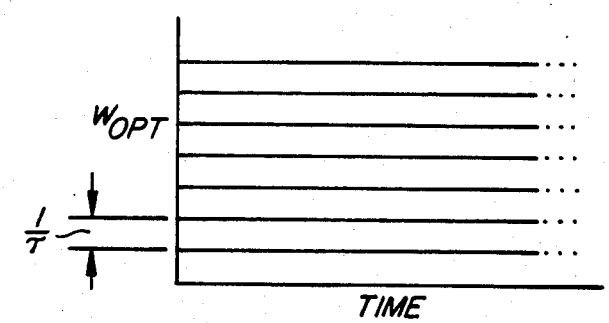
FIG._1A.
PRIOR ART
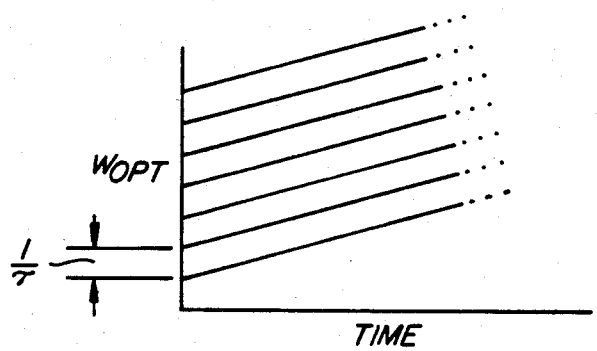
FIG._1B.
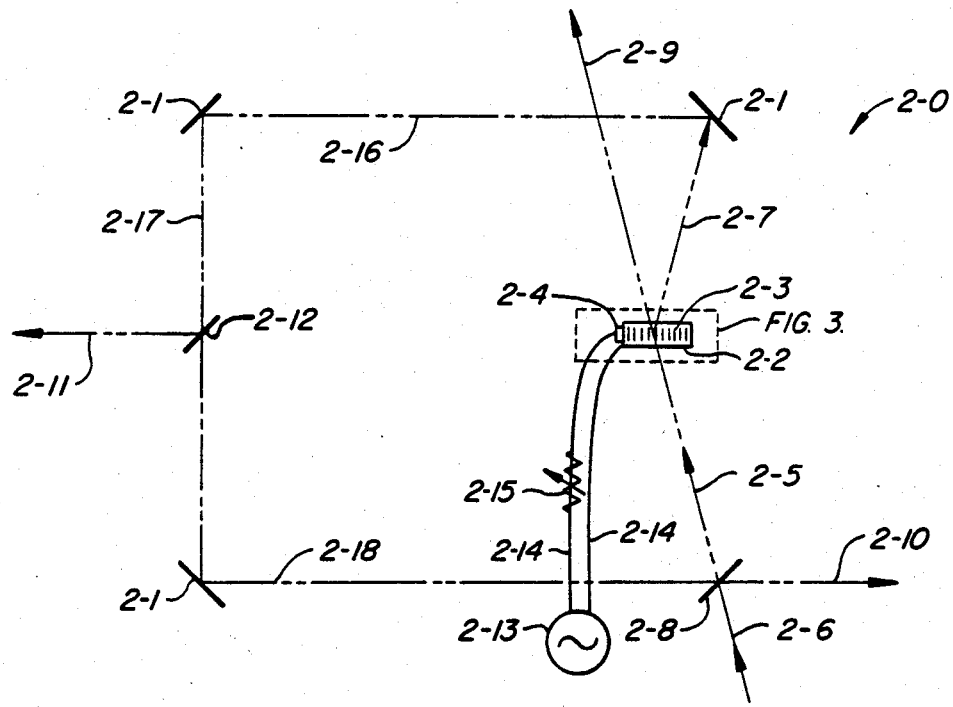
FIG._2.

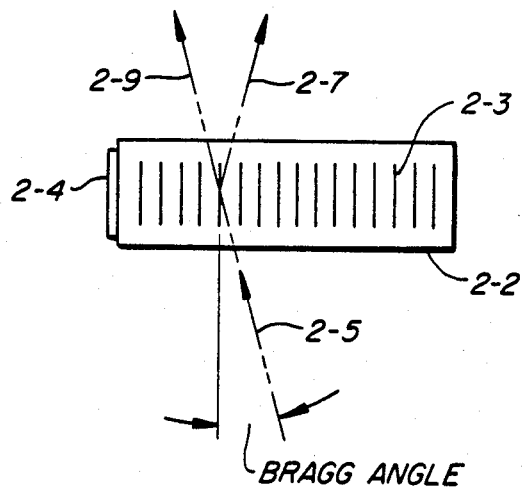
FIG._3.
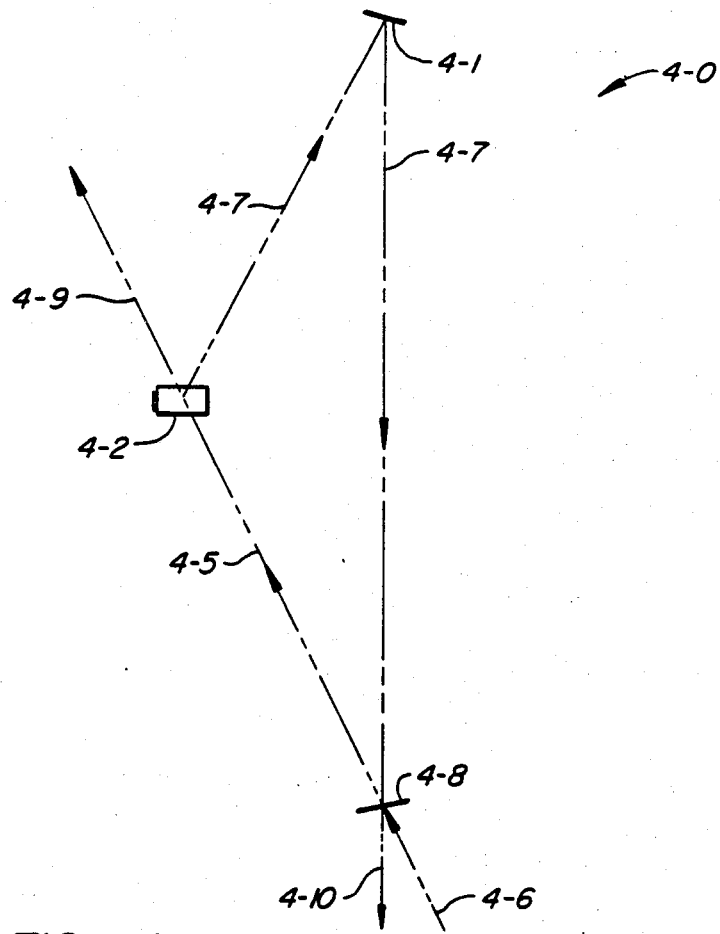
FIG._4.

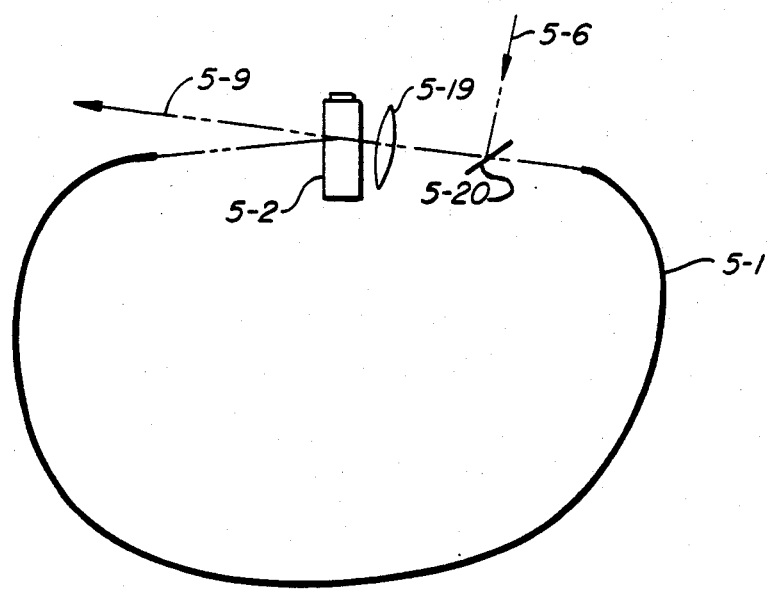
FIG._5.
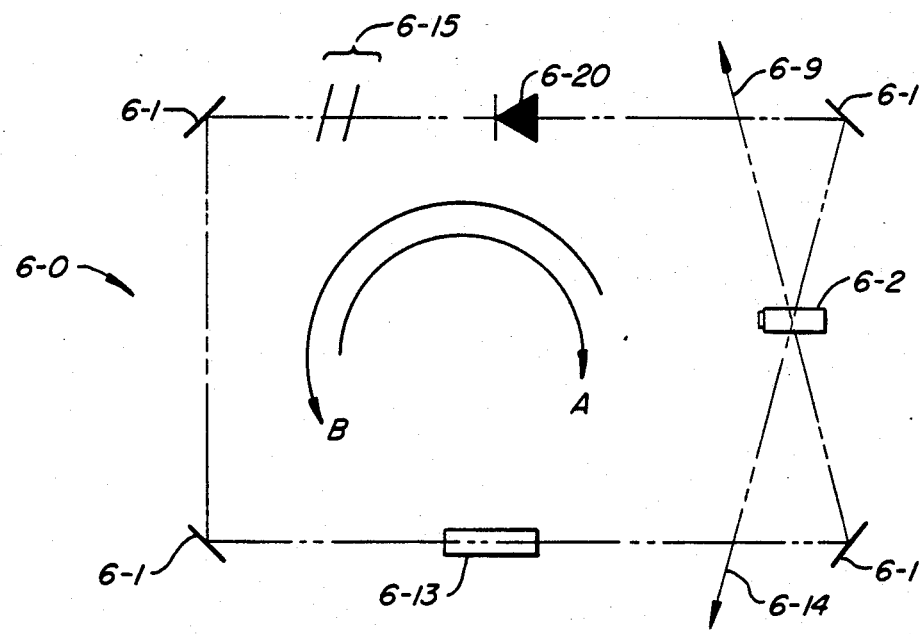
FIG._6.

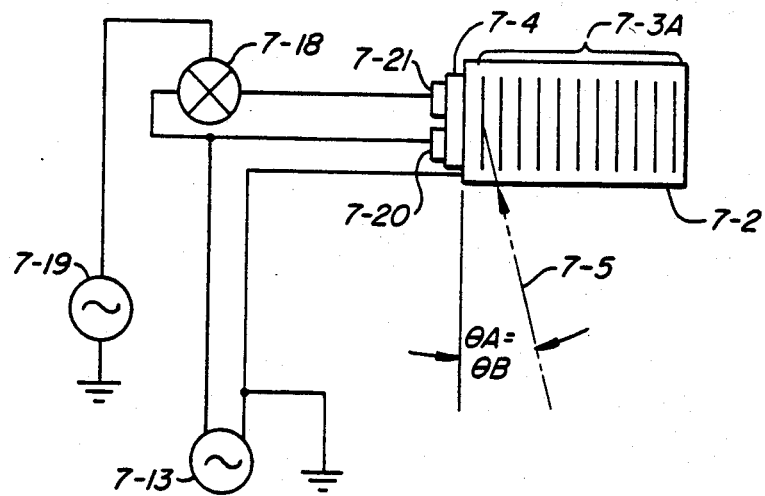
FIG._7A.
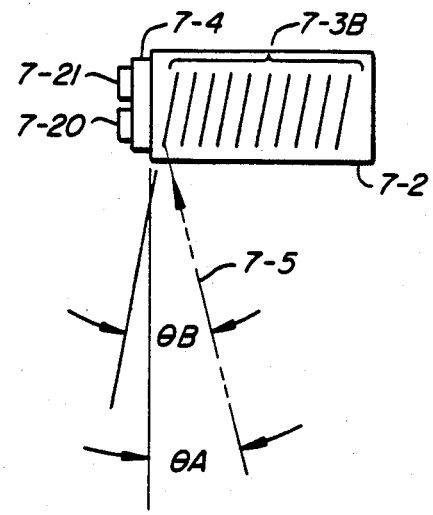
FIG._7B.

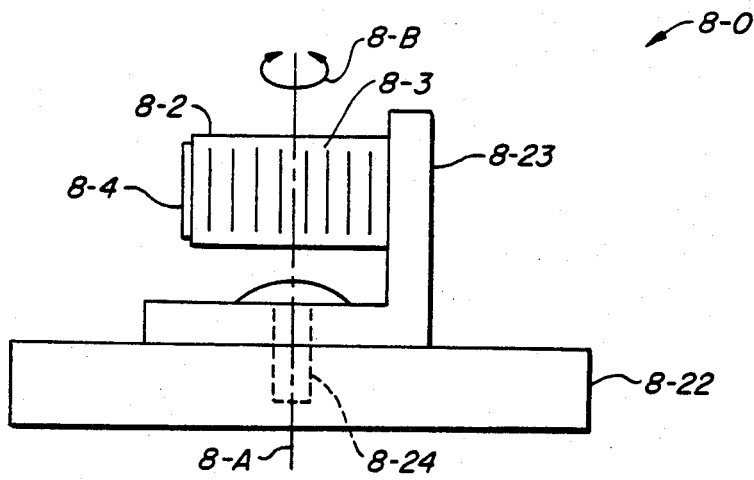
FIG._8.
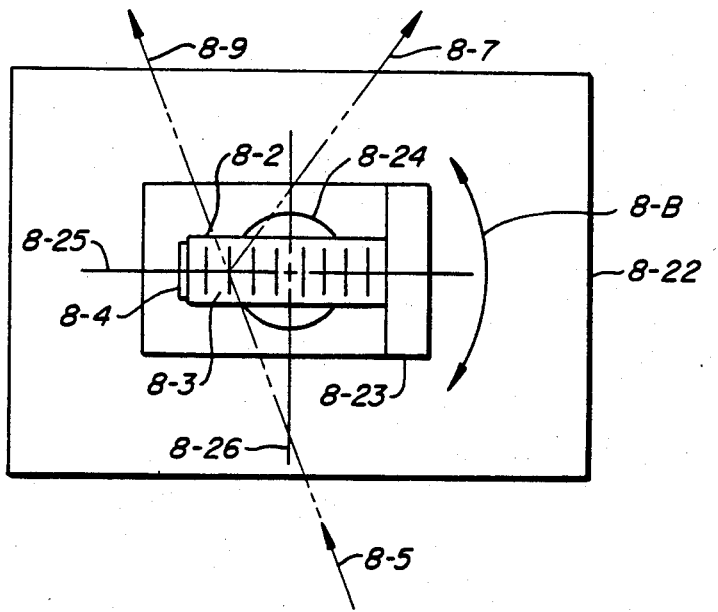
FIG._9.

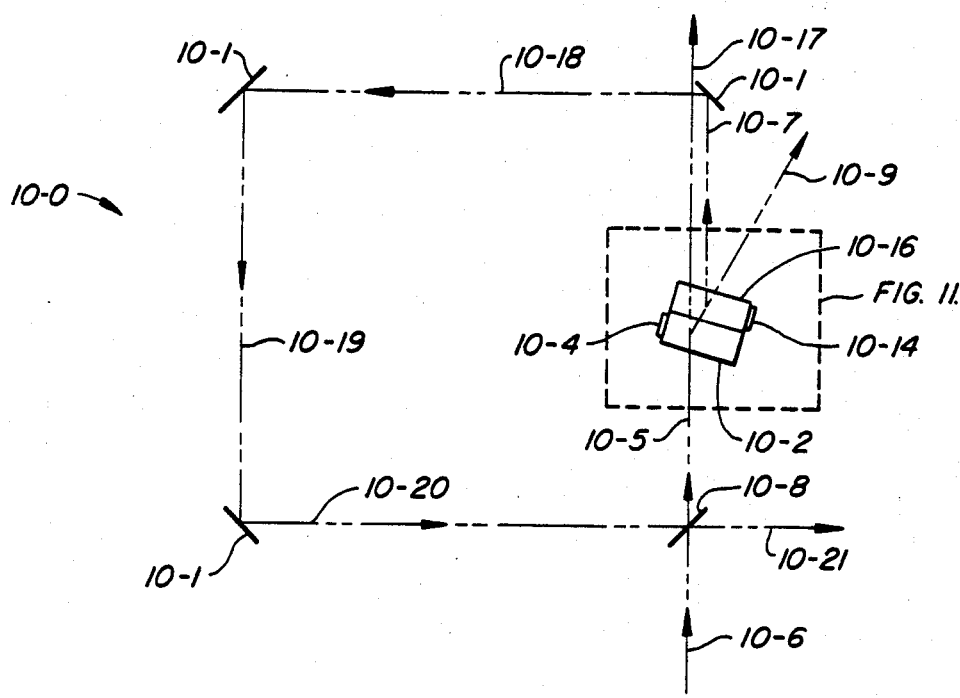
FIG.__10.
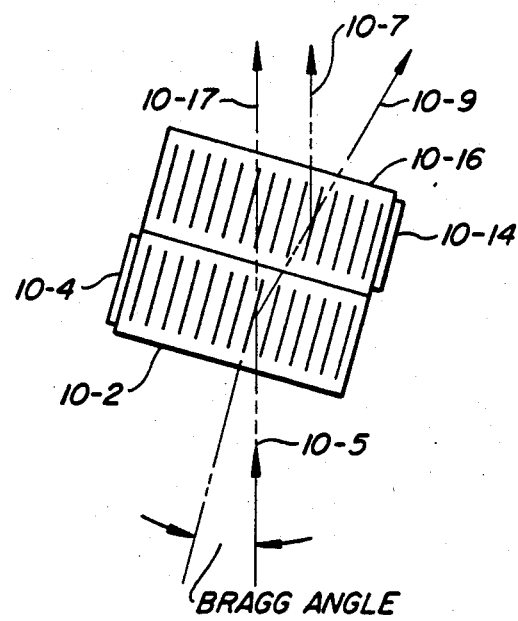
FIG.__11.

FREQUENCY SHIFTED CAVITY FOR ELECTROMAGNETIC RADIATION

The invention relates to the field of optical amplifiers and electromagnetic radiation cavity filters. More specifically, this invention relates to a frequency shifted cavity for electromagnetic radiation and a scanning laser.

BACKGROUND OF THE INVENTION

The prior art uses optical cavities to filter electromagnetic radiation. Optical cavities are also used in conjunction with optical amplifiers to generate coherent radiation. More specifically, ring-type optical cavity filters can filter and generate radiation whose instantaneous frequency is changing in time. Changing the optical path length of the cavity causes the resonant modes of the cavity to shift in frequency at the same time rate as the desired frequency shift rate of the radiation to be filtered or generated. The optical path length of a cavity is changed with electro-optic devices such as rotating brewster plates as in the Model #699-05 ring cavity laser produced by Coherent Corp. or by electro-optic crystal devices such as the Series #620 phase/frequency modulators produced by Interactive Radiation, Inc. in Northvale, N.J. The optical path length of a cavity may also be changed by mechanically or piezoelectrically moving one of the mirrors which form the cavity. Electro-optic devices are currently not capable of causing path length changes of more than about 0.01% in a typical cavity. The mechanical and piezoelectric means are difficult to construct with sufficient precision for causing a cavity path length change corresponding to a frequency shift of more than approximately 100 resonant mode spacings for a one-meter long cavity. Further, shifting the frequency of the resonant modes of a cavity by changing the cavity length also changes the difference in frequency between two different modes.

SUMMARY OF THE INVENTION

We have invented a frequency shifted cavity whose stationary mode solutions actually have instantaneous frequencies which change in time, thus eliminating the need for changing the optical path length within the cavity and also eliminating the change in the difference in frequency between two different resonant modes. In the preferred embodiment the time rate at which the instantaneous frequency changes is determined by the frequency of an acoustic wave within an electromagnetic wave frequency shifter. Our invention, the frequency shifted cavity for electromagnetic radiation, is useful in the construction of optical amplifiers, electromagnetic wave cavity filters, scanning lasers and other electro-optic devices. The spectrum of electromagnetic radiation over which our invention is operable is limited only by the components incorporated therein. Improvements in the components would expand the range of electromagnetic radiation capable of being filtered and/or generated by our invention.

An alternative embodiment of the invention provides means and methods for varying the output coupling by varying the intensity of the acoustic wave within the electromagnetic frequency shifter or by varying the orientation of the said shifter.

Still another embodiment provides a means and method for correcting the change in the deflection angle of said shifter as caused by a change in the frequency of the acoustic wave. This permits the tuning of the time rate of change of the instantaneous frequency of the cavity mode without substantially changing the "Q" or quality factor of the cavity.

An additional alternative embodiment of the invention provides a method and means for suppressing one or more particular cavity modes by the insertion of an optical filter into the cavity.

A further embodiment permits the optical cavity to generate electromagnetic radiation, the instantaneous frequency of which changes in time, by placing an optical amplifier within the cavity so as to cause oscillation of a cavity mode.

A still further embodiment provides a method and means for suppressing oscillation of the cavity in one of the directions within the cavity by placing an optical diode within the cavity.

Any of the additional and/or alternative embodiments can be incorporated alone or together with our basic invention. In addition, these and other objects, features, embodiments and advantages of the invention will be understood from the following description of preferred embodiments.

BRIEF DESCRIPTION OF THE DRAWINGS

FIG. 1A represents the optical frequency, $\omega_{opt}$, as a function of time, T, for some resonant modes of an optical cavity designed in accordance with the prior art.

FIG. 1B represents the optical frequency, $\omega_{opt}$, as a function of time for some resonant modes of the optical cavities formed by the present invention.

FIG. 2 is a schematic representation of an embodiment of the invention.

FIG. 3 illustrates the acousto-optic device of FIG. 2 in more detail.

FIG. 4 is a schematic representation of an alternative embodiment and optical cavity geometry of the invention.

FIG. 5 is a schematic representation of an embodiment of the invention where an optical fiber forms the optical cavity.

FIG. 6 is a schematic representation of another embodiment of the invention which includes an optical diode, an optical amplifier, and an etalon.

FIG. 7A illustrates an acousto-optic device capable of beamsteering.

FIG. 7B illustrates the acousto-optic device of FIG. 7A in more detail.

FIG. 8 is a mounting arrangement for the acousto-optic Bragg cell which provides a method and means for changing the orientation of the Bragg cell.

FIG. 9 is a top view of FIG. 8.

FIG. 10 is a schematic representation of the invention further including an additional acousto-optic cell.

FIG. 11 is a portion of FIG. 10 expanded to show the additional Bragg cell.

DETAILED DESCRIPTION

The invention comprises an electromagnetic wave frequency shifter such as an acousto-optic Bragg cell and an optical cavity defined by devices which direct electromagnetic waves, e.g. mirrors, folding prisms, optical fibers, and the like. The cavity is geometrically configured such that when a diffraction limited beam of electromagnetic radiation, hereafter beam I, is directed to said shifter; a portion of the radiation from beam I which emerges from said shifter, hereafter called beam II, and having its frequency shifted by an amount w radians per second is also eventually directed to said shifter essentially along the same geometric path as beam I and having the same polarization as beam I. Likewise beam II will have a portion shifted and directed along the same geometric path.

The utility of the invention can be understood by considering it to form a resonant cavity for electromagnetic waves, the cavity being the geometric space occupied by beam II. The cavities of our invention thus formed will have a discrete set of modes or solutions whose electric or magnetic field components can be mathematically represented EQ 1 below:

$$F_M(x,T) = B\exp\left\{-i\left[\left(T-\frac{x}{c}\right)^2\frac{wc}{2L} + \left(T-\frac{x}{c}\right)\left(\frac{\Omega+2\pi M}{\tau}+\frac{W}{2}\right)+\rho\right]\right\} \quad \text{EQ 1}$$

where
- B is the amplitude of the field,
- T is the time,
- c is the speed of light in a vacuum,
- w is the amount of which the angular frequency of beam I is shifted by the said frequency shifter,
- x is the optical path length to the point at which $F_M(x,T)$ is being evaluated. It may be measured along beam II starting from the intersection of the geometric extension of beam I and beam II. x is positive when measured in the direction of propagation of beam II and negative when measured in the opposite direction,
- L is the total optical path length as measured along beam II for one round trip of the cavity. It is always positive,
- M is the number of the discrete cavity mode and is an integer,
- $\tau$ is the amount of time taken for light to make one round trip of the cavity along the path of beam II. It equals L/C,
- $\rho$ is an arbitrary phase term. It remains constant for all values of x and T, and
- $\Omega$ is a constant which is determind by the phase of the acoustic wave at T=0.
- exp is an abbreviation which indicates that the quantity immediately following in brackets is to be considered as the exponent of e.

The modes represented by $F_M(x,T)$ have a frequency which changes linearly with time and linearly along the optical path length. Mathematically expressed:

$$-\frac{\partial\theta}{\partial T} = \frac{wc}{L}T - \frac{w}{L}x + \frac{\Omega+2\pi M}{\tau} + \frac{w}{2} \quad \text{EQ 2}$$

where $\partial\theta/\partial T$ is the instantaneous angular frequency denoted by $\omega_{opt}$ and can be expressed in radians per second.

The principal feature of the present invention which distinguishes it from the prior art is contained within a consideratiokn of $\omega_{opt}$. FIG. 1A illustrates the variation of $\omega_{opt}$ with time for some resonant modes at some stationary geometric point within a resonant cavity designed according to the prior art.

In FIG. 1A $\omega_{opt}$ is constant in time for each resonant mode of the cavity as represented by the horizontal lines. The time variation of $\omega_{opt}$ for a particular value of x, for the resonant modes produced by our invention, is displayed in FIG. 1B. The significant feature is that, for each mode, $\omega_{opt}$ increases as time increases. Additionally, it is to be noted that for specific values of x and T, the difference in angular frequency between adjacent modes is, for each case:

$1/\tau$ which, disregarding material dispersion, is constant.

The invention can be used to filter electromagnetic radiation by directing an input beam of electromagnetic radiation to be filtered essentially along the path of beam I. For example, an embodiment of the invention as a frequency shifted cavity is illustrated as 2-0 in FIG. 2 and FIG. 3. In FIGS. 2 and/or 3, 2-1 denotes the devices which direct electromagnetic radiation such as mirrors. Suitable mirrors are available from Spectra Physics, Laser Instrument Division, Montainview, CA. 2-2 denotes a frequency shifter, for example, an acousto-optic Bragg cell. The terms acousto-optic Bragg cell and Bragg cell, as used herein, are synonyms. A suitable Bragg cell is a model H-211, a product of the Harris Corporation, Melbourne, FL. An alternative acoustic-optic device is disclosed in U.S. Pat. No. 4,265,517, incorporated herein by reference. 2-3 denotes the acoustic wave in the Bragg cell. 2-4 denotes the transducer of the Bragg cell. 2-5 denotes the optical path of said beam I which is also the same path as the said input beam 2-6 of electromagnetic radiation to be filtered, hereafter called input beam. The input beam 2-6 enters the ring cavity through a partially reflecting mirror 2-8. 2-7 denotes the path of radiation emerging from a non-zero diffraction order of the Bragg cell 2-2. 2-9 denotes the path of that portion of radiation which emerges from the Bragg cell in the zero diffraction order. 2-16, 2-17 and 2-18 denote different portions of the optical path within the cavity. 2-12 denotes an optical output coupler which may be a partially reflecting mirror. 2-13 denotes the electronic alternating current power supply for the transducer 2-4 of Bragg cell 2-2. 2-14 denotes electrical conductors. 2-15 denotes an optical variable resistor electronically in series with 2-13 and 2-4 which can be used to vary the intensity of the acoustic wave. If necessary, the polarization of the electromagnetic radiation can be adjusted with devices such as Soleil Babinet compensators, products of the Karl Lambrecht Corp. Chicago, Ill., or wave plates, and the like.

In this embodiment, the transmitted output beam from the filter 2-0 is the radiation along path 2-9 which is that portion of the radiation from beam I and beam II which emerges from the Bragg cell 2-2 in the zero diffraction order. Bragg cell 2-2 may therefore serve as the output coupler. Alternatively, the transmitted output can be a beam extracted from beam II anywhere inside the cavity. For example, the transmitted output could be beam 2-11 in FIG. 2 which is extracted from the cavity by partially reflecting mirror 2-12 which serves as the output coupler. Alternatively, the output could be beam 2-10 which is from partially reflecting mirror 2-8 and is reflected or rejected radiation from the filter 2-0.

The invention allows that the intensity of the acoustic wave 2-3 may be varied so as to vary the portion of the radiation from beam I and beam II which emerges from the Bragg cell 2-2 in the zero diffraction order. Since radiation which merges in the zero order is output from the cavity, varying the acoustic intensity will have the effect of varying the "Q" or "quality factor" of the cavity.

The electric or magnetic field of the transmitted output radiation can be mathematically denoted as $$F\left(T - \frac{Y}{c}\right), \text{ for } Y > 0$$

where Y is measured along the optical path of the input and output beam, and is zero at the same geometric point where x=0 i.e., the intersection of the geometric extension of beam I and beam II. Further, Y is negative at points along beam 2-6 and positive at points along beam 2-9. When the transmitted output beam is the zero diffraction order of the Bragg cell, e.g., beam 2-9 in FIG. 2, then F'(T−Y/c) can be further specified in terms of the input beam which is represented mathematically by the function $$F\left(T - \frac{Y}{c}\right), \text{ for } Y \leq 0$$

This can be done as follows:
Let $$\delta = T - (Y/c)$$

Then $$F\left(T - \frac{Y}{c}\right) = F(\delta)$$

Transform F(δ) into the M mathematic space according to the prescription:

$$\int_{-\infty}^{+\infty} F(\delta) G^*(\delta, M) d\delta = \Psi(M) \quad \text{EQ 3}$$

where G*(δ,M) is just the complex conjugate of the formula for the modes of the cavity which for this example is:

$$G^*(\delta, M) = \exp\left\{i\left[\delta^2 \frac{wc}{2L} + \delta\left(\frac{\Omega + 2\pi M}{\tau} + \frac{w}{2}\right)\right]\right\} \quad \text{EQ 4}$$

where, however, M can be smoothly varying.
Next multiply Ψ(M) by the M space transfer function for the filter, viz.:

$$\Psi(M)H(M) \quad \text{EQ 5}$$

Finally allow M to be a real number which varies smoothly so that the following inverse transform can be performed.

$$\int_{-\infty}^{+\infty} \Psi(M) H(M) G(\delta, M) dM = F\left(T - \frac{Y}{c}\right)$$

where
G(δ,M) is the complex conjugate of G*(δ,M) and H(M) is just the M space filter transfer function of the cavity and is given by the expression:

$$H(M) = \frac{\sqrt{1 - L_0^2}}{1 - \sqrt{1 - L_T^2} \exp(i 2\pi M)} \quad \text{EQ 6}$$

where
$L_0$ is the fractional decrease or loss in amplitude which a single beam of radiation would sustain in traveling only the optical path which directly connects the input and output beams,
and
$L_T$ is the fractional decrease or loss in amplitude which a single beam of radiation would sustain for one complete round trip of the cavity.

Equation 6 has the same form as the transfer function for common Fabry-Perot interferometer and a common ring cavity. In the embodiment illustrated in FIG. 2, Equation 6 applies if the Bragg cell is used as the output coupler. Further, when Equation 4 is applied in the analysis of the invention configuration shown in FIG. 2 then w in Equation 4 may be replaced by $w_aN$ where $w_a$ is the angular frequency of the acoustic wave and N is the number of the non-zero diffraction order. The sign of N is chosen so as to be positive if the Bragg cell raises the frequency and negative if it lowers the frequency of radiation traveling in the direction shown.

If means other than a Bragg cell is used for the output coupler, then Y as it appears in:

$$F\left(T - \frac{Y}{c}\right)$$

must be redefined to take into account the additional optical path length which the transmitted output beam must travel within the cavity before reaching the output coupler. For example, in FIG. 2 the optical path denoted as 2-6, 2-5, and 2-9 is the path along which Y is measured if the Bragg cell is the output coupler. However, if output coupler 2-12 is used, then Y must be measured along the optical path denoted as 2-6, 2-5, 2-7, 2-16 and 2-17 and 2-11 in FIG. 2. Furthermore, if the output coupler is a Bragg cell and is located within the cavity such that the said additional path length extends into the Bragg cell and extends from there in a non-zero diffraction order n, then the M space filter transfer function of Equation 6 must be multiplied by:

$$\exp\left[-i \frac{nW_a}{c}\left(T - \frac{Y}{c}\right)\right]$$

This multiplication will take into account the additional frequency shift, $nW_A$, which will be experienced by the output beam. The sign of n is positive if the said additional path length extends through the Bragg cell so as to raise the optical frequency and negative if so as to lower the optical frequency of the output beam.

Alternative to using Equation 6, the exact M space filter transfer function can always be determined empirically by actually assembling the specific filter and injecting radiation having a known phase and amplitude and an instantaneous frequency which changes the rate of W/τ.

The invention can have configurations other than that illustrated in FIG. 2. FIG. 4 illustrates an embodiment in which the ring cavity 4-0 is formed by three path segments rather than the five as indicated in FIG. 2. In the configuration shown in FIG. 4, 4-1 is a mirror; 4-2 is the frequency shifter, in this instance a Bragg cell; 4-8 is a partially reflecting mirror which may serve as the input and output coupler. The input beam 4-6 enters the cavity through the partially reflecting mirror 4-8. The beam 4-9 is that portion of the input beam which emerges from the Bragg cell in the zero diffraction order and may be the transmitted output beam. The beam 4-7 is the portion of the beam emerging from the Bragg cell in a non-zero diffraction order and which is directed toward mirror 4-1. A portion of this beam may be directed out of the cavity into beam 4-10 by passing it through the partially reflecting mirror 4-8. Beam 4-10 is the reflected or rejected radiation from the filter 4-0. A portion of the remainder of beam 4-7 will be directed also by Bragg cell 4-2 essentially along the same path and direction as beam 4-6 and having essentially the same polarization as beam 4-6. The two systems, 2-0 and 4-0, are topologically similar and hence they will perform in similar fashion.

The embodiment illustrated in FIG. 5 consists of an optical fiber 5-1 a focusing lens 5-19 and a Bragg cell 5-2. The optical fiber guides the electromagnetic radiation and performs the same function as do the reflectors 2-1 shown in FIG. 2 in forming the ring cavity. 5-20 is a partially reflecting mirror which is used as the input coupler for input beam 5-6. The lens is used to focus radiation wich exits one end of the fiber so it may enter the other end of the fiber. The preferred type of optical fiber for use in the invention is single mode optical fiber. Further additional mechanical stability can be achieved if the said fiber is polarization maintaining fiber as is available from Andrew Corporation, Orland Park, Ill. When using optical fibers having high numerical apertures, >0.08, to form the cacvity; it may be necessary to use two lenses. The first lens can be used to collimate the light leaving one end of the fiber so all of it can enter the acousto-optic Bragg cell nearer to the Bragg angle. The second lens can be used to focus the light leaving the Bragg cell in a non-zero diffraction order so it may enter through the other end of the fiber.

Frequency shifters other than a Bragg cell may be employed in this invention. Alternatively, one might use the frequency shifter described in U.S. Pat. No. 3,834,790 and incorporated herein by reference. Some frequency shifters do not deflect the frequency shifted beam. These shifters can be used in a configuration wherein the output beam is extracted from the ring-cavity by for example the output coupler 2-12 as indicated in FIG. 2. The term, frequency shifter, excludes those devices, which when inserted into the cavity, cause the resonant mode frequencies to shift by altering the total optical path length of the cavity. This is because those said devices also will change the difference in optical frequency between resonant modes.

The invention can be used to filter the output of a scanning dye laser. In such cases the filter will tend to only transmit that laser light which is scanning at the proper rate and has an instantaneous angular frequency corresponding to the instantaneous angular frequency of one of the invention's modes. This is similar to the operation of a normal multi-pass filter except that the invention's modes have angular frequencies which change in time whereas the frequencies of the modes of a normal cavity are constant in time. When a normal cavity is used to filter light from a scanning laser, the optical path length within the cavity must be changed. This is normally accomplished using mechanical systems which are difficult to construct to the necessary precision. The present invention eliminates the need for such mechanical systems.

The invention also provides for an embodiment wherein an optical amplifier is within the cavity. FIG. 6 illustrates a frequency shifted cavity which incorporates an optical amplifier 6-13 wherein the combination forms a frequency shifted scanning laser 6-0. In FIG. 6, 6-1 denotes mirrors and 6-2 denotes the acousto-optic Bragg cell. If the gain of the amplifier is sufficiently high to overcome the optical losses in the cavity from the cavity components, i.e., Bragg cell, mirrors, etc., then oscillation will occur similar to that which occurs in commercially available lasers. However, instead of the oscillation occurring in modes of constant frequency, as in commercial lasers, the oscillation in the invention occurs in the modes described in Equation 1. The output from the oscillating cavity can be along the same paths as for the non-oscillating cavity. The output beam of the cavity during oscillation will be a mode or modes, the frequency of which changes in time. In cases when two or more modes are oscillating, the difference in optical frequency between three oscillating modes remains constant. An example of an optical amplifier 6-13 may be a dye jet as is used in the dye laser #699-05 manufactured by Coherent Inc., Palo Alto, CA. The dye may be LD700 which is available from Exciton Chemical Company, Dayton, OH. The dye is dissolved in ethylene glycol or other suitable solvents. The dye may be optically pumped with a model #3000K krypton laser, a product of Coherent Inc. The krypton laser should be adjusted to operate at 647 nanometers. Some of the mirrors 6-1 may have curved surfaces to focus the energy distribution of the modes to the pumped region of the dye jet and/or to reduce cavity diffraction losses as for cavities of the prior art. Finally the Bragg cell 6-2 can be a model 1205 modulator manufactured by Isomet Corporation, Springfield, VA. An amplifier of course may be placed within other forms of the cavity such as embodiment 4-0 shown in FIG. 4 in which case the output could be along path 4-9.

The time rate at which the angular frequency of the output of the invention changes is the same as that rate for the modes. This rate is determined by the acoustic frequency through Equation 2. As an example: Let $w_A = 2\pi \cdot 10^8$ radians/sec.
$L = 1$ meter
$c = 3 \cdot 10^8$ meters/sec
$N = 1$
Therefore $$\partial^2 \theta / \partial T^2 \approx 1.8 \cdot 10^{17} (RAD/SEC^2)$$

This means that the instantaneous angular frequency of the output for each oscillating mode would change at a rate of $1.8 \times 10^{17} (radsec^{-2})$. Obviously, the oscillation for any mode cannot continue indefinitely since the optical frequency would eventually fall outside of the spectral range of the gain of the optical amplifier and/or the Bragg region of the Bragg cell. Were this to happen, mode hopping would result, e.g. as a particular oscillating mode proceeds outside of the spectral range of the gain of the optical amplifier the cavity will begin to oscillate at another mode, the frequency of which enters the spectral range of the amplifier.

In alternative embodiments, one or more wavelength filters are inserted into the cavity. A wavelength filter may be, for example, a common Fabry-Perot etalon, 6-15 in FIG. 6. Suitable etalons are available from Burleigh Instruments, Inc., Fishers, N.Y. The purpose of the wavelength filter is to restrict the number of oscillating cavity modes. For example, with the addition of an etalon, the only cavity modes which can oscillate are those which have an instantaneous angular frequency which is at or very near a spectral transmission peak of the etalon. Since the cavity modes have angular frequencies which change in time, it will be necessary to scan the transmission peaks of the etalon so they will follow the frequencies of the cavity modes if the oscillating cavity modes are to remain in oscillation. The etalon 6-15 may be scanned in either of the manners used for scanning the intracavity etalons in the Coherent, Inc. model #699-05 dye laser, e.g., the separation between the etalon mirrors may be changed by using a piezoelectric material to move one of the etalon mirrors with respect to the other or the etalon itself can be tilted.

The invention provides that the Bragg cell 6-2, 4-2, 5-2 and 2-2 used as the frequency shifter within the cavity can also be used as a wavelength filter within the cavity to limit the amount by which the instantaneous frequency of a mode can change. As previously explained, as the instantaneous frequency of a mode changes, it will eventually fall outside the Bragg spectral region of the acousto-optic Bragg cell. As a consequence, the diffraction efficiency of the Bragg cell for this mode will decrease thus coupling more energy out of the cavity. This will have the effect of lowering the "Q" or quality factor for this mode. In embodiments employing optical amplifiers, i.e., lasers, the limited Bragg spectral regions can therefore be used to suppress the oscillation of one or more cavity modes.

The invention also provides that the spectral center of the Bragg spectral region can be varied by steering the acoustic wave, a process called beamsteering. Beamsteering is used in some commercially available Bragg cells, for example, the model LS 110 produced by Isomet Corporation, Springfield, VA. In the prior art, beamsteering is used to tilt the acoustic wave so as spectrally move the Bragg region for different acoustic frequencies. The effect achieved allows the acoustic frequency to be changed while keeping the input radiation within the Bragg spectral region for an essentially constant input optical frequency. The present invention, however, uses beamsteering to allow the optical frequency of the input radiation to change while keeping the input radiation within the Bragg spectral region. This can be accomplished by delaying the phase of the alternating electrical energy to one or more of the beamsteering electrodes as compared to the phase of the alternating electrical energy to each other of the two or more beamsteering electrodes. This delay causes a tilt in the wavefront of the acoustic wave. The amount of tilt and the direction of the tilt is determined by the delay. By varying the delay, the tilt can be varied so as to vary the spectral location of the Bragg spectral region for a particular geometrical path for input radiation. The acoustic Bragg cell can therefore be used as a wavelength filter within the cavity and beamsteering can be used to adjust the spectral location of this so-formed wavelength filter.

Particularly, beamsteering as described above can be used to cause the Bragg spectral region to be spectrally coincident, i.e. track, the instantaneous optical frequency of one or more cavity modes and to suppress one or more other cavity modes. FIGS. 7A and 7B illustrate schematically an example of a Bragg cell 7-2 with beamsteering which can be used as the frequency shifter within for example the cavities 6-0, 4-0 or 2-0 to track the instantaneous frequency of one or more cavity modes. The Bragg cell 7-2 can be used in conjunction with or in place of Bragg cell 6-2 in FIG. 6.

Referring to FIG. 7A and/or 7B, 7-2 denotes the Bragg cell. The lines 7-3A and 7-3B depict planes of approximately equal acoustic phase, e.g., acoustic wavefronts. 7-4 denotes the acoustic transducer. 7-20 and 7-21 denote electrodes used for beamsteering. 7-5 denotes the path of the input radiation. $\theta B$ denotes the Bragg angle. $\theta A$ denotes the angle between the input radiation path and the plane of the transducer. 7-13 denotes an electrical alternating current power supply which supplies the power directly to electrode 7-20 and indirectly to electrode 7-21 through phase modulator 7-18. 7-19 denotes another variable frequency electrical alternating current power supply the output signal of which is directed to modulator 7-18 wherein it modulates the phase of the alternating current which is directed to electrode 7-21.

In FIG. 7A there is essentially no phase difference between the electrical signal to electrode 7-20 and that to electrode 7-21. The lines 7-3A depicting constant acoustical phase are therefore essentially parallel to the plane of the interface between the transducer 7-4 and the electrodes 7-20 and 7-21. The Bragg angle $\theta B$ in this situation equals $\theta A$.

If the optical frequency of the input beam 7-5 changes, as will occur for radiation in the modes described by Equation 1, then the Bragg angle will change. By the injection of a signal into modulator 7-18 the wavefront of the acoustic wave will be tilted with respect to the input path 7-5. FIG. 7B depicts the Bragg cell with the tilted acoustic wavefront. The invention uses this means of tilting the acoustic wave front so that the input radiation along path 7-5 may enter the Bragg cell at the Bragg angle even though the changing optical frequency of the input radiation is causing the Bragg angle to change.

In another preferred embodiment, an optical diode can be inserted into the frequency shifted cavity. The diode uses the Faraday effect in such a manner as to suppress cavity oscillation in one direction. As an example, the diode 6-20 may be inserted into cavity 6-0 as shown in FIG. 6. Suitable optical diodes are available from Coherent Inc., Palo Alto, CA. Referring to FIG. 6, if electromagnetic radiation in a particular mode is traveling in the clockwise direction A in FIG. 6, then the output of the laser 6-0 will be along path 6-14 of FIG. 6. If the electromagnetic radiation is traveling around the cavity in a counterclockwise direction B in FIG. 6, then the output will be along the path 6-9. Placing the optical diode 6-20 into the cavity can suppress oscillation in either of these two directions, thus causing the invention to have only one output beam, i.e., either 6-9 or 6-14. The addition of the diode will also reduce or eliminate standing optical waves within the optical amplifier. As is known in the art, standing waves in the amplifier can cause modal instabilities within the cavity as well as reducing the effective gain of the amplifier. Presently available optical diodes function only for finite ranges of optical frequencies and therefore, a diode should be selected which has an optical range which has about the same spectral location as the gain of the optical amplifier.

The embodiment of the invention which includes an optical amplifier capable of achieving oscillation within the cavity, i.e., laser 6-0, will have an optical output whose instantaneous frequency will change in time. This embodiment of the invention can be used to replace commercially available scanning output lasers, such as the Coherent Inc. model #699-05 dye laser. The Coherent laser has a total continuous scan range limited to less than ~60 GHZ. This is because the modes of the cavity of the laser must be scanned mechanically by means of a rotating Brewster plate. The laser embodiment of our invention has cavity modes which scan without the use of a Brewster plate and therefore may be used to supply laser light which may be scanned more than 100 GHZ and preferably more than 1000 GHZ continuously.

FIGS. 8 and 9 illustrate a device 8-0 for changing the orientation of the Bragg cell so as to change the output coupling. In FIG. 8 and/or 9, 8-2 denotes the Bragg cell, 8-4 denotes the transducer of the Bragg cell, 8-3 denotes the acoustic wave with the Bragg cell, 8-5 denotes a path of radiation entering the Bragg cell at or near the Bragg angle, 8-9 denotes the path of radiation originally in path 8-5 and leaving the Bragg cell in the zero diffraction order, 8-7 denotes the path of radiation originally in path 8-5 and leaving the Bragg cell in a non-zero diffraction order, 8-22 denotes a mechanical mounting base, 8-23 denotes a mechanical mounting bracket, 8-24 denotes a pin about which the bracket 8-23 will rotate, 8-A denotes the axis of the said rotation and arrows denoted as 8-B further illustrate the said rotation. 8-25 and 8-26 are center lines, the intersection of which is the center of said rotation in FIG. 9. The bracket 8-23 can be rotated about axis 8-A by hand thus causing a change in the output coupling from the frequency shifted cavity of our invention when the device of FIG. 8-0 is substituted for the Bragg cell in any of the embodiment of our invention such as Bragg cell 2-2, 4-2, 5-2 and 6-2.

A second Bragg cell can also be inserted into the frequency shifted cavity of our invention. The second Bragg cell is positioned so as to compensate for the change in the non-zero diffraction order deflection angle resulting from a change in the frequency of the acoustic wave within the first Bragg cell. This second Bragg cell, therefore, allows the frequency scan rate of the cavity modes to be changed with greater ease. FIG. 10, part of which is expanded and illustrated in FIG. 11, is a schematic representation of an embodiment of the invention which incorporates the a second Bragg cell 10-16 transducer 10-14 affixed thereto. The frequency shifted cavity 10-0 has a first Bragg cell 10-2 which incorporates a transducer 10-4. The cavity 10-0 is formed by mirrors 10-1 and Bragg cell 10-2 and 10-16. The input coupler may be a partially reflecting mirror 10-8. The beam of electromagnetic radiation within the cavity is illustrated by 10-7, 10-18, 10-19, 10-20, and 10-5. The input may be along beam path 10-6 and the transmitted output may be either along beam path 10-17 or 10-9 which are the zero diffraction order beams leaving the Bragg cells 10-2 and 10-16 respectively. Alternatively, the output could be along beam path 10-21 which is from partially reflecting mirror 10-8 and is the reflected or rejected output of the filter 10-0. The invention provides for the use of a second Bragg cell, positioned so as to compensate for the said change in the deflection angle, in all embodiments of the frequency shifted cavity including 2-0, 4-0, 5-0 and 6-0.

In the embodiment of FIGS. 10 and 11, Bragg cells 10-16 and 10-2 are oriented so that radiation in beam path 10-5 enters Bragg cell 10-2 at or near the Bragg angle and the electromagnetic radiation originally from beam path 10-5 and leaving Bragg cell 10-2 in a non-zero diffraction order enters Bragg cell 10-16 at or near the Bragg angle and that portion of the radiation which leaves Bragg cell 10-16 in a non-zero diffraction order is directed along beam path 10-5 and into Bragg cell 10-2. When the acoustic frequency, $W_A$, in Bragg cells 10-2 equals that of Bragg cell 10-16, then beam path 10-5 will be parallel to beam path 10-7 thus reducing the need for realignment of the mirrors 10-1 so as to maintain the existence of a cavity for a changing acoustic frequency. The modes of the embodiment of FIGS. 10 and 11 can be represented mathematically by the same formula as in Equation 1 if $W_A$ is replaced by $2W_A$.

Our invention has been described in detail with particular reference to preferred embodiments thereof, but it will be understood that variations and modifications can be affected within the spirit and scope of the invention.

What is claimed is:

1. An electromagnetic radiation frequency shifting apparatus comprising:
   (1) electromagnetic radiation directing means for directing radiation in a predetermined optical cavity configuration; and
   (2) electromagnetic radiation frequency shifter means positioned in said predetermined optical cavity configuration so that when a diffraction limited beam of electromagnetic radiation is directed to said electromagnetic radiation frequency shifter means, a portion of said radiation from said diffraction limited beam of electromagnetic radiation which emerges from said electromagnetic radiation frequency shifter means, having its frequency shifted, is also directed to said electromagnetic radition frequency shifter means by said electromagnetic radiation directing means along essentially the same predetermined optical cavity configuration and in essentially the same direction as said diffraction limited beam of electromagnetic radiation so as to have essentially the same polarization as said diffraction limited beam of electromagnetic radiation.

2. The apparatus according to claim 1 wherein said electromagnetic radiation directing means define an optical cavity wherein the geometric configuration of the cavity has a discrete set of modes represented by $$F_M(x,T) = B\exp\left\{-i\left[\left(T - \frac{x}{c}\right)^2 \frac{wc}{2L} + \left(T - \frac{w}{c}\right)\left(\frac{\Omega + 2\pi M}{\tau} + \frac{w}{2}\right) + \rho\right]\right\}$$

wherein, B is the amplitude of the field, T is the time, c is the speed of lighting a vacuum; w is the amount by which the angular frequency of a beam I is shifted by said electromagnetic radiation frequency shifter means; x is the optical path length to the point at which $F_M(x, T)$ is being evaluated, wherein x is positive when measured in the direction of propagation of a beam II and negative when measured in the direction opposite thereto; L is the total optical path length as measured along said beam II for one round trip of said predetermined optical cavity configuration; M is the number of discrete cavity modes and is an integer; $\tau$ is the amount of time taken for the electromagnetic radiation to make one round trip of the cavity along the path of said beam II, wherein $\tau$ equals L/c; $\rho$ is an arbitrary phase term and remains constant for all values of x and T; $\Omega$ is a constant which is determined by the phase of an acoustic wave at T=0; and exp is an abbreviation which indicates that the quantity immediately following in brackets is to be considered as the exponent of e.

3. The apparatus according to claim 1 wherein the electromagnetic radiation directing means is selected from the group consisting of mirrors, folding prisms, optical fibers, or combinations thereof.

4. The apparatus according to claim 3 wherein said electromagnetic radiation frequency shifter means is an acousto-optic Bragg cell and power supply means to power said acousto-optic Bragg cell.

5. The apparatus according to claim 4 further comprising means for adjusting the degree of output coupling by said Bragg cell.

6. The apparatus according to claim 5 wherein said means for adjusting the degree of output coupling by the Bragg cell adjusts the orientation of said Bragg cell.

7. The apparatus according to claim 5 wherein said means for adjusting the degree of output coupling by the Bragg cell adjusts the intensity of the acoustic wave within the Bragg cell.

8. The apparatus according to claim 5 further comprising an optical amplifier positioned in the path of the electromagnetic radiation, said optical amplifier selected to have sufficient optical gain to cause oscillation of a cavity mode.

9. The apparatus according to claim 8 further comprising an etalon placed within the formed optical cavity to suppress the excitation of at least one cavity mode.

10. The apparatus according to claim 9 further comprising a second acoustic-optic Bragg cell located within the path of electromagnetic radiation and positioned to compensate for the change in the non-zero diffraction order deflection angle resulting from a change in the frequency of the acoustic wave within said acousto-optic Bragg cell.

11. The apparatus according to claim 10 further comprising an optical diode in the path of electromagnetic radiation.

12. The apparatus according to claims 2, 4, 5, 8 or 10 wherein said electromagnetic radiation directing means is an optical fiber.

13. The apparatus according to claims 2, 3, 4, 5, 8, 10 or 11 wherein said electromagnetic radiation directing means is at least two mirrors.

14. The apparatus according to claim 13, wherein the electromagnetic radiation is directed along a polygonal geometric path.

15. The apparatus according to claim 1 further comprising an output coupling means and an optical amplifier so positioned in the path of the electro-magnetic radiation and so selected to have sufficient optical gain within cavity to cause oscillation of a cavity mode.

16. The apparatus according to claim 1 wherein said electromagnetic radiation frequency shifter means is an acousto-optic Bragg cell and power supply means to power said acousto-optic Bragg cell.

17. The apparatus according to claim 4, 5, 8, 9, 10, 11, or 16 further comprising beamsteering means for maintaining the diffraction limited beam within the spectral region of Bragg cell.

18. An apparatus for generating electromagnetic radiation comprising:
(1) electromagnetic radiation directing means for directing electromagnetic radiation in a ring cavity configuration;
(2) an acousto-optic Bragg cell positioned in said ring cavity configuration so that when a diffraction limited beam of electromagnetic radiation is directed to said Bragg cell, a portion of said radiation emerging from said Bragg cell in a non-zero diffraction order and having its frequency shifted, is also directed to said Bragg cell by said electromagnetic radiation directing means along essentially the same path and in essentially the same direction as said diffraction limited beam of electromagnetic radiation so as to have essentially the same polarization as said diffraction limited beam of electromagnetic radiation;
(3) power supply means connected to said Bragg cell; and
(4) an optical amplifier positioned in said ring cavity configuration to impart sufficient optical gain to said portion of said electromagnetic radiation to cause oscillation of a cavity mode.

19. The apparatus according to claim 18 wherein said electromagnetic radiation directing means comprise at least two mirrors.

20. The apparatus according to claim 19 further comprising at least one etalon in said configuration to suppress the excitation of at least one cavity mode.

21. The apparatus according to claim 20 wherein said etalon is tunable to suppress one or more different cavity modes.

22. The apparatus according to claim 20 further comprising an optical diode in said configuration to suppress the oscillation of cavity modes having radiation traveling in one of the directions within said configuration.

23. The apparatus according to claim 22, further comprising means for adjusting the degree of the output coupling of said Bragg cell.

24. A method of filtering electromagnetic radiation comprising:
(a) directing a beam of electromagnetic radiation in a predetermined ring cavity configuration;
(b) shifting the frequency of a portion of said beam of electromagnetic radiation; and
(c) directing said frequency shifted portion of said beam of electromagnetic radiation along essentially the same configuration and in essentially the same direction as said beam of electromagnetic radiation so as to have essentially the same polarization as said beam of electromagnetic radiation.

25. A method of generating electromagnetic radiation comprising:
(a) directing a beam of electromagnetic radiation in a predetermined ring cavity configuration;
(b) shifting the frequency of a portion of said electromagnetic radiation;
(c) directing said frequency shifted portion of said electromagnetic radiation along essentially the same configuration and in essentially the same polarization as said beam; and (d) amplifying the shifted portion of said electromagnetic radiation in said configuration to cause oscillation of a cavity mode.

26. The method according to claims 24 or 25 wherein said beam of electromagnetic radiation is directed in said predetermined ring cavity configuration through the use of a directing means selected from the group consisting of mirrors, folding prisms, optical fibers, or combinations thereof.

27. The method according to claim 26 wherein a portion of the electromagnetic radiation is shifted by an acousto-optic Bragg cell.

28. The method according to claim 27 further comprising adjusting the output portion of the electromagnetic radiation from said ring cavity with said Bragg cell.

29. The method according to claim 28 wherein adjusting the output portion of the Bragg cell adjusts the intensity of the acoustic wave within the Bragg cell.

30. The method according to claim 29 further comprising suppressing the excitation of at least one cavity mode.

31. The method according to claim 30 further comprising adjusting for the change in the non-zero diffraction order deflection angle resulting from a change in the frequency of the acoustic wave within the Bragg cell.

32. The method according to claim 31 further comprising beamsteering the acoustic-wave within said Bragg cell.

33. The method according to claim 32 further comprising suppressing the cavity modes having radiation traveling in one of the directions within said configuration.

34. The method according to claim 24 further comprising amplifying the shifted portion of said electromagnetic radiation to cause oscillation of a cavity mode.

* * * * *